April 25, 1961 J. W. HORTON 2,981,891

STORAGE DEVICE

Filed June 30, 1958 2 Sheets-Sheet 1

INVENTOR

John W. Horton

BY Geoffrey Knight

ATTORNEY

INVENTOR
John W. Horton
BY Geoffrey Knight
ATTORNEY

United States Patent Office 2,981,891

Patented Apr. 25, 1961

2,981,891

STORAGE DEVICE

John W. Horton, New York, N.Y., assignor to International Business Machines Corporation, New York, N.Y., a corporation of New York Filed June 30, 1958, Ser. No. 745,403

6 Claims. (Cl. 328—124)

This invention relates to storage devices and more particularly to a cathode ray tube storage device utilizing bombardment induced conductivity effects. Cathode ray tubes are ideally suited as storage devices in digital computers because of the possibility of storing a large number of bits in each tube combined with rapid storage and access time. Prior art devices, however, have suffered from a number of disadvantages which has limited the application of these tubes as storage devices. The well-known Williams tube, for example, is characterized by output voltages in the range between 0.5 and 1.0 millivolt, destructive readout, and the necessity of regenerating the stored information periodically.

The novel cathode ray tube storage device, according to the invention is characterized by a plurality of semiconductor target electrodes, in which the deflection of a beam of radiant energy to a first target electrode causes the storage device to switch from a first state to a second state, deflection of the beam to a second target electrode develops a non-destructive readout, and deflection of the beam to a third target electrode causes the storage device to reset to said first state. Advantages of the novel storage device include readout signals in the range of one to ten volts and improved switching time since reading in and readout of storage does not involve the charging of a capacitance by the beam of radiant energy, rather an ionization of the semiconductor is involved.

It is an object, therefore, of the invention to provide a novel cathode ray tube storage device.

Another object of the invention is to provide a novel storage device with non-destructive readout.

A still further object of the invention is to provide a novel storage device having increased speeds of read-in and readout.

Other objects of the invention will be pointed out in the following description and claims and illustrated in the accompanying drawings, which disclose, by way of example, the principle of the invention and the best mode which has been contemplated of applying that principle.

Figure 1:
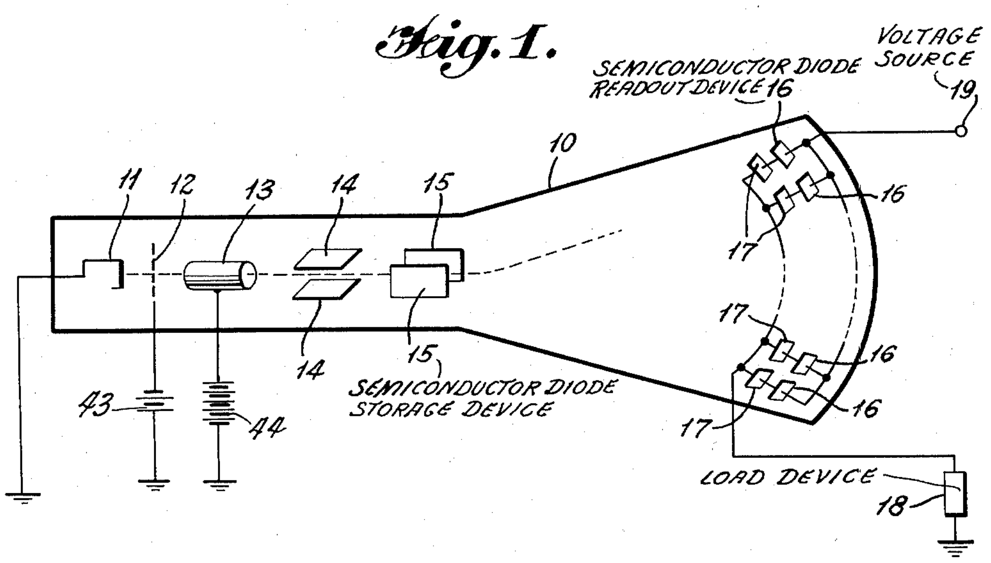
Fig. 1 shows a simplified embodiment of the invention.

Referring now to the drawings, Fig. 1 illustrates a simplified embodiment of the invention, by way of example, wherein a cathode ray tube 10, having means for generating a beam of electrons, a plurality of target electrodes, and means to direct said beam to said targets, is utilized as a storage device. A standard "electron gun" consisting of cathode 11, control grid 12, and focusing and accelerating electrode 13 is shown as a means to generate an electron beam, by way of example, but it should be understood that any other means for generating a beam of electrons may be used. Deflection plates 14 and 15 are used to cause the electron beam to strike one of a plurality of semiconductor storage devices 16, or one of a plurality of semiconductor readout devices 17.

The combination of storage device 16 and readout device 17 is characterized, as hereinafter more fully explained, by having in series at least two stable current conducting conditions. The electron beam, by modifying the voltage current curve of storage device 16, causes the series combination to switch from a normal low current conducting condition to a high current conducting condition. Similarly, the electron beam, when directed to the readout device 17, modifies its voltage current curve and in conjunction with a load device 18, said modification indicates the current conducting condition.

Figure 2:
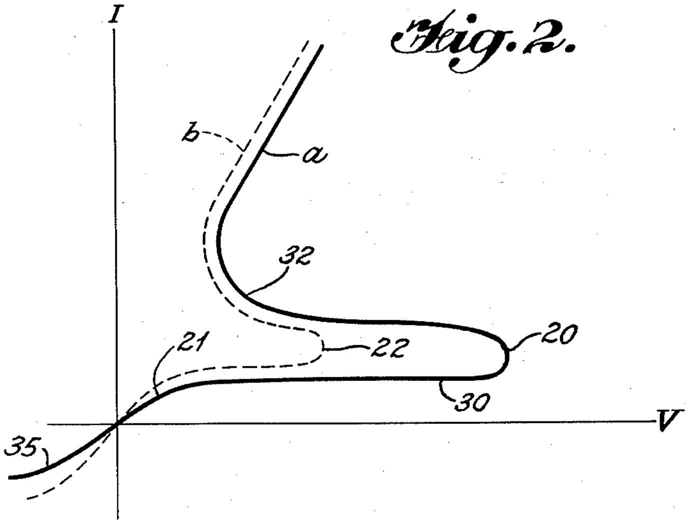
Fig. 2 is a voltage current curve of a first semiconductor device.

Storage device 16 is selected from one of several types of diodes which are appropriate for use in this device and exhibit a negative resistance characteristic similar to that shown in Fig. 2. As shown in curve *a* of Fig. 2, the current is relatively constant for a large range of applied voltages indicated by the essentially straight line connecting points 21 and 30. As the voltage is further increased a critical voltage is reached beyond which the slope of the curve is in the opposite direction and varies along the curve, indicating a negative resistance. This critical voltage or turnover voltage is indicated at 20. Curve *b* of Fig. 2 shows the modification of the voltage current characteristic of the negative resistance diode under control of an electron beam. In particular when an electron beam is directed to a critical region of the negative resistance diode the value of turnover voltage is reduced from the value indicated at 20 to a lower value indicated at 22.

Of the several types of negative resistance diodes adaptable to the invention the following are illustrative. The Reeves diode described in Electrical Communication, June 1955, at pages 112 to 117 exhibits the curves shown in Fig. 2. The action of this diode when subjected to electron bombardment is not completely known, but it is believed that the beam of electrons produce hole-electron pairs (ionizes the germanium) in or close to that region of semiconductor where there is a high electric field. The electrons are swept to the whisker of the diode by this field, producing a current which modifies the electric field in the semiconductor. This additional field modifies the current voltage characteristic, causing in particular the decrease in turnover voltage as shown in Fig. 2. Alternatively the desired results can be obtained from the Avalanche Injection Diode described in the Proceedings of the Physical Society, volume 69B, 1956, at page 781 which operates in a similar manner. In like manner the PNPN Diode described in the Proceedings of the IRE, volume 44, September 1956, at pages 1174 to 1182 can be employed. In this diode, the change in turnover voltage is particularly marked and the negative resistance portion of the voltage-current characteristic may be removed completely by the action of the electron beam. Additionally, the desired characteristic can be obtained between two terminals of an avalanche transistor.

A preferred embodiment of the invention employs the Reeves or avalanche injection diodes as each of these may be turned on in about $5\times10^{-9}$ seconds and turned off in about $7\times10^{-9}$ seconds. PNPN diodes are slower by a factor of 10 and transistors are also, in general, slower than the preferred diodes.

Figures 3, 4, 5:
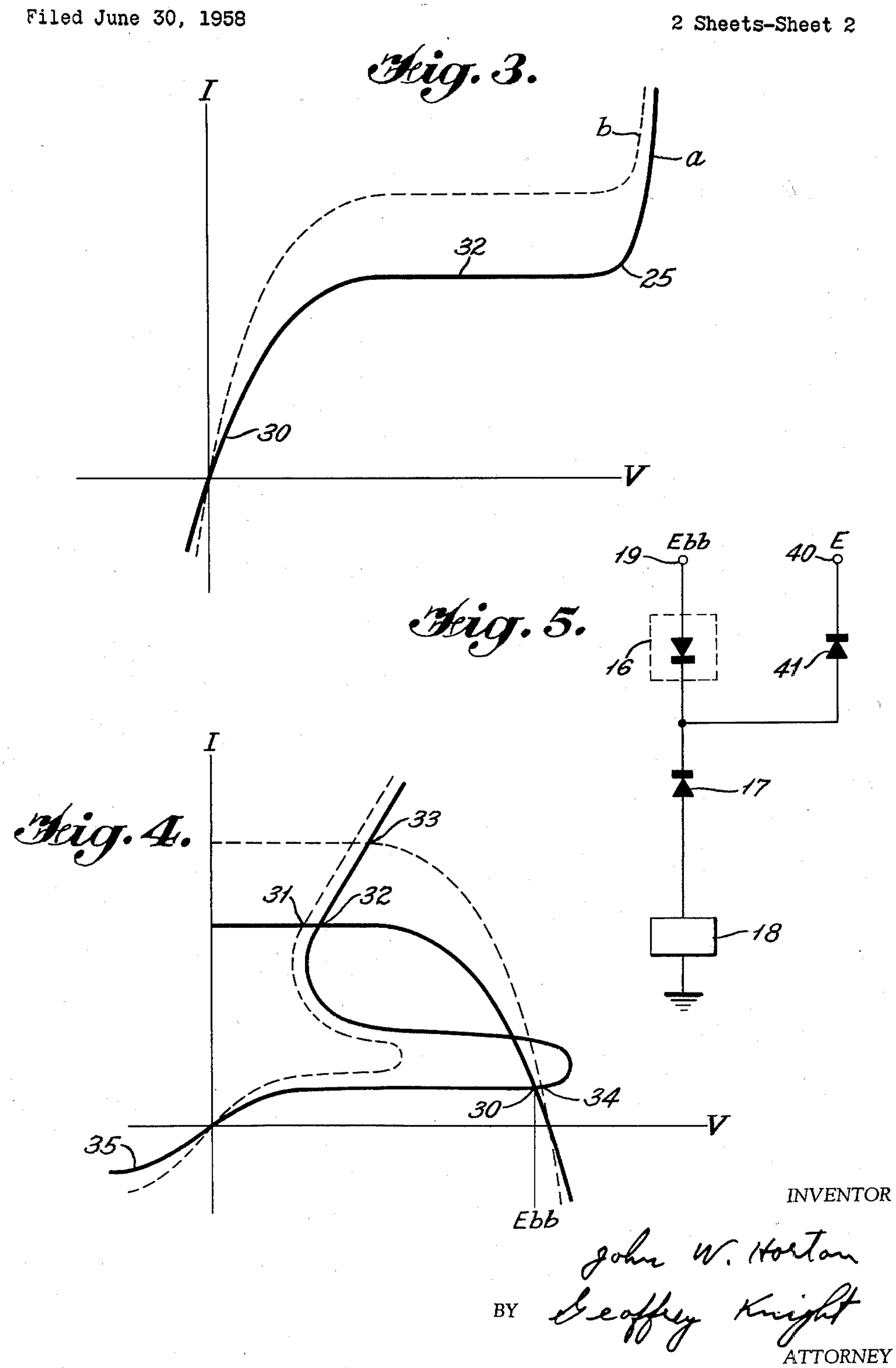
Fig. 3 is a voltage current curve of a second semiconductor device.
Fig. 4 is a voltage current curve of the series connection of a first semiconductor device and a second semiconductor device.
Fig. 5 shows a third semiconductor device in a modified form of the invention.

Readout device 17 may be a metal film diode as shown in U.S. Patent No. 2,786,880 to McKay or a junction diode. Fig. 3 shows the characteristics of the readout diode. This diode has a region of relatively constant current as a function of the applied reverse voltage as shown by the line connecting the points 30 and 32 along curve *a*. As the reverse voltage is further increased diode breakdown occurs as shown by point 25. The action if the electron beam on the readout diode is indicated by the curve *b* of Fig. 3. This increase of current by the electron beam is typically 30 milliamperes.

As shown in Fig. 1 the storage diodes 16 and readout diodes 17 are connected in series between a voltage source 19 and a load 18 and the operation of a storage diode and a readout diode may best be understood with reference to Fig. 4, which shows the readout diode as a load line for the storage diode. If the voltage applied to the serially connected diodes is increased from 0 to Ebb, a stable operating point, indicated at 30, is reached where the greatest portion of the voltage appears across the storage diode. Application of the electron beam to the storage diode reduces the turnover voltage, as hereinbefore explained, and the diode begins to conduct heavily and operating point 31 is obtained. Upon removal of the electron beam from the storage diode, stable operating point 32 results, wherein the major portion of the supply voltage appears across the readout diode. If the value 0 is assigned to stable operating point 30 and the value 1 assigned to stable operating point 32, a binary storage device results. The storage device can be reset to 0 by momentarily interrupting the current through the diodes.

In order to read out the stored value the beam is deflected to the load diode in series with the storage diode whose value is to be determined. Referring to Fig. 4 if a 1 is stored, deflection of the beam to the readout diode causes the operating point to shift from 32 to 33. Removal of the beam returns the system to stable operating point 32 indicating a stored 1. The readout, therefore, is non-destructive when a 1 is stored. In like manner if a 0 is stored, deflection of the electron beam to the readout diode causes the operating point to shift from 30 to 34. Again removal of the beam returns the system to stable operating point 30 indicating a stored 0. The readout therefore is also non-destructive when a 0 is stored.

By means of a third diode simliar to the readout diode, the electron beam itself can be used to reset the storage device. Referring now to Fig. 5, a reset diode 41 is connected to the junction formed by storage diode 16 and readout diode 17 and also connected to a source of supply voltage 40 which is greater than Ebb. When the beam is directed to the reset diode its current is increased as shown by Fig. 3. By arranging that the increase in current be more than enough to supply the current required by the readout diode when a 1 is being stored, the current through the storage diode will be reversed since the reset diode appears as a low resistance and is returned to a voltage greater than that to which the storage diode is returned. With the beam deflected to reset diode 41 the operating point of the storage diode is shifted to 35 of Fig. 2. Removal of the beam from the reset diode results in stable operating point 30 being obtained or, more particularly, a 0 is stored and the storage device has been reset.

As shown in Fig. 1 a number of units can be connected in parallel within the tube with only two leads connected thereto. The common load element 18 for obtaining readout voltage pulses may be a coil permitting each storage diode to be turned on in turn by the electron beam without affecting the bias across other diodes in the store. Parallel connection of the storage units is also feasible because if either a 0 or a 1 is stored the dynamic resistance of the series combination of the storage diode and readout diode is greater than the 10,000 ohms. This results from the fact that when a 0 is stored the storage diode resistance is 10,000 ohms (although the readout diode may be as low as 10 ohms) and conversely when a 1 is stored the dynamic resistance of the readout diode is 100,000 ohms, although the storage diode may be as low as 100 ohms).

Although an electron beam has been chosen, by way of example, to illustrate the action of the novel storage device, it will be apparent to one skilled in the art, that other types of radiant energy could be used. Additionally the semiconductor devices of the invention have been illustrated as separate elements, by well-known etching and shaping techniques, however, a single wafer containing a plurality of alternate conductivity types of semiconductor material may be employed.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device comprising a first semiconductor device having a negative resistance characteristic over a portion of its voltage current curve, a second semiconductor device, a source of electrical energy, means to connect said first and second semiconductor devices and said source device in series, said source device being polarized to reverse-bias said second semiconductor device, said first and second semiconductor devices having in series at least two stable current conditions, and means for selectively altering the conductivity of either of said semiconductor devices including means to generate a beam of electrons and means for selectively directing said beam onto either of said semiconductor devices, said beam being effective when directed onto said first semiconductor device to select a second of said stable current conditions.

2. A storage device comprising a first semiconductor device having a negative resistance characteristic over a portion of its voltage current curve, a second semiconductor device, a third semiconductor device, a first source of electrical energy, means to connect said first and second semiconductor devices and said first source device in series, said first source device being polarized to reverse-bias said second semiconductor device, said first and second semiconductor devices having in series at least two stable current conditions, a second source of electrical energy whose magnitude is greater than the magnitude of said first source, means to connect said third semiconductor device in series between the junction of said series connected first and second semiconductor devices and said second source device, said second source device being polarized to reverse-bias said third semiconductor device, and means for selectively altering the conductivity of said semiconductor devices including means to generate a beam of electrons and means for selectively directing said beam onto said semiconductor devices, said beam being effective when directed onto said first semiconductor device to select a second of said stable current conditions and effective when directed onto said third semiconductor device to select a first of said stable current conditions.

3. In combination, an electron beam tube comprising, means to generate a beam of electrons, a plurality of pairs of targets for said electron beam, said pairs of targets electrically connected in parallel, each of said pairs of targets consisting of first and second semiconductor devices electrically connected in series, whose conductivity characteristics are modified when bombarded by said electron beam, said first semiconductor device having a negative resistance characteristic over a portion of its voltage current curve, means to selectively direct said electron beam to any of the plurality of targets, a utilization device, a source of electrical energy, and means to connect said utilization device, said source of electrical energy, and said pairs of targets electrically in series, whereby each of said plurality of pairs of targets normally conducts a first value of current therethrough, said beam being effective when selectively directed to said first semiconductor device of any of said pairs of targets to cause a second value of current to flow through said selected target.

4. A storage device comprising: a storage diode operable to store information; a load diode operable to read out information; a source of electrical current; means connecting said diodes electrically in series with said source whereby the voltage current curves of said diodes intersect in at least two stable operating points, and said diodes normally conduct a first value of current; and means to read in and read out information from said device including means to generate a beam of electrons and means to selectively direct said beam to said diodes, said beam effective when directed to said storage diode to switch the current conducted by said diodes from said first value to a second value, and effective when directed to said load diode to indicate which of said first and second current values is being conducted by said diodes.

5. A storage device comprising: a storage diode and a load diode; each of said diodes having a voltage current curve which is modified by a beam of radiant energy; said storage diode having a negative resistance characteristic over at least a portion of its voltage current curve, a source of electrical current; a utilization device; means connecting said diodes, said source, and said utilization device electrically in series whereby a first value of current flows through said utilization device; means to generate a beam of radiant energy; and means to selectively direct said beam to either of said diodes; said last named means effective when directing said beam to said storage diode to switch said first value of current to a second value and effective when directing said beam to said load diode to indicate the value of current through said utilization device.

6. A storage device comprising: a storage diode; a load diode; a reset diode; each of said diodes having a voltage current curve which is modified by a beam of radiant energy; said storage diode having a negative resistance characteristic over at least a portion of its voltage current curve; a first source of electrical energy; a utilization device; means connecting said storage diode, said load diode, said first source, and said utilization device electrically in series whereby a current having a first value flows through said utilization device; a second source of electrical energy; means connecting said reset diode electrically in series between said second source and the junction of said serially connected storage and load diodes; means to generate a beam of radiant energy; and means to selectively direct said beam to any of said diodes; said last named means effective when directing said beam to said storage diode to switch said current through said utilization device from said first value to a second value, effective when directing said beam to said load diode to indicate the value of current through said utilization device, and effective when directing said beam to said reset diode to switch said current through said utilization device from said second value to said first value.

References Cited in the file of this patent

UNITED STATES PATENTS

| | | |
|---|---|---|
| 2,547,386 | Gray | Apr. 3, 1951 |
| 2,589,704 | Kirkpatrick et al. | Mar. 18, 1952 |
| 2,655,625 | Burton | Oct. 13, 1953 |
| 2,691,727 | Lair | Oct. 12, 1954 |
| 2,772,360 | Shockley | Nov. 27, 1956 |
| 2,786,880 | McKay | Mar. 26, 1957 |

FOREIGN PATENTS

| | | |
|---|---|---|
| 692,337 | Great Britain | June 3, 1953 |

OTHER REFERENCES

Reeves: Electrical Communication, June 1955, pp. 112 to 117.